(12) United States Patent
Maliverney

(10) Patent No.: US 8,465,807 B2
(45) Date of Patent: Jun. 18, 2013

(54) METHOD FOR COATING A TIN-FREE SILICON COMPOSITION ON A FLEXIBLE MEDIUM

(75) Inventor: Christian Maliverney, Saint Julien sur Bibost (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 13/378,410

(22) PCT Filed: Jun. 14, 2010

(86) PCT No.: PCT/FR2010/000433
§ 371 (c)(1),
(2), (4) Date: Mar. 12, 2012

(87) PCT Pub. No.: WO2010/146250
PCT Pub. Date: Dec. 23, 2010

(65) Prior Publication Data
US 2012/0164335 A1  Jun. 28, 2012

(30) Foreign Application Priority Data

Jun. 15, 2009 (FR) .................................... 09 02884

(51) Int. Cl.
*B05D 7/24* (2006.01)
*B05D 3/10* (2006.01)
*C08G 77/08* (2006.01)

(52) U.S. Cl.
USPC .............. 427/342; 427/340; 427/387; 528/21

(58) Field of Classification Search
None
See application file for complete search history.

(56) References Cited

U.S. PATENT DOCUMENTS

| 4,339,563 | A | * | 7/1982 | Takago et al. ................... 528/14 |
| 4,358,613 | A | * | 11/1982 | Mark ............................. 564/238 |
| 4,395,526 | A | * | 7/1983 | White et al. .................... 528/18 |
| 4,472,551 | A | * | 9/1984 | White et al. ................... 524/728 |
| 4,489,127 | A |   | 12/1984 | Butek et al. |
| 4,515,932 | A | * | 5/1985 | Chung ............................. 528/16 |
| 4,814,368 | A | * | 3/1989 | Stein et al. .................... 524/158 |
| 6,235,832 | B1 | * | 5/2001 | Deng et al. ..................... 524/525 |
| 6,906,161 | B2 | * | 6/2005 | Sakamoto et al. .............. 528/35 |
| 8,372,935 | B2 | * | 2/2013 | Maliverney et al. ............ 528/21 |
| 2005/0014894 | A1 | * | 1/2005 | Flannigan et al. ............. 524/864 |
| 2009/0182091 | A1 | * | 7/2009 | Noro et al. ..................... 524/588 |
| 2009/0182099 | A1 | * | 7/2009 | Noro et al. ..................... 525/474 |
| 2010/0036049 | A1 | * | 2/2010 | Matsushita et al. ........... 524/588 |

FOREIGN PATENT DOCUMENTS

EP  1 985 666  A1  10/2008

OTHER PUBLICATIONS

International Search Report (PCT/ISA/210) issued on Aug. 20, 2010, by French Patent Office as the International Searching Authority for International Application No. PCT/FR2010/000433.

* cited by examiner

*Primary Examiner* — Robert S Loewe
(74) *Attorney, Agent, or Firm* — Dentons US LLP

(57) ABSTRACT

A method is described for coating a flexible medium made from fabric, paper, polyvinyl chloride, polyester, polypropylene or polyethylene terephthalate with a tin-free elastomer silicon composition that can be cross-linked by polycondensation.

8 Claims, No Drawings

METHOD FOR COATING A TIN-FREE SILICON COMPOSITION ON A FLEXIBLE MEDIUM

This application claims priority under 35 U.S.C. §119 of FR 0902884, filed Jun. 15, 2009, and is the United States national phase of PCT/FR2010/000433, filed Jun. 14, 2010, and designating the United States (published in the French language on Dec. 23, 2010, as WO 2010/146250A1; the title and abstract were also published in English), each hereby expressly incorporated by reference in its entirety and each assigned to the assignee hereof.

The present invention relates to a method for coating a flexible substrate which is made of textile, of paper, of polyvinyl chloride, of polyester, of polypropylene, of polyamide, of polyethylene, of polyurethane, of nonwoven fiberglass fabrics or of polyethylene terephthalate with a tin-free, polycondensation-crosslinkable, elastomeric silicone composition.

The general field of the invention is that of using silicone compositions which are crosslinkable by polycondensation reactions, to produce an elastomer, optionally in the form of a thin layer, on a flexible substrate which is made of textile, of paper, of polyvinyl chloride, of polyester, of polypropylene, of polyamide, of polyethylene, of polyurethane, of nonwoven fiberglass fabrics or of polyethylene terephthalate.

There are numerous applications for the coating of silicone formulations onto flexible substrates. For example, when the flexible substrate is a textile, water repellency properties are the goal, or, when the substrate is a piece of paper or a polymer of type PVC, PET, etc., the desire most often is for release properties.

Accordingly, following application to a substrate, the silicone formulation crosslinks to form a solid coating of silicone elastomer. In these liquid silicone coating formulations, the silicone phase may be diluted in a solvent.

A known use of crosslinkable silicone compositions is for the coating of textile materials for the purpose of obtaining properties of adhesion to the skin and nonslip, such as, in particular, for certain clothing and hygiene articles. However, the tackifying effect, in other words the adhesion effect, is not always obtained, or not sufficiently.

Also known is the use of crosslinkable silicone compositions for preparing water-repellent and release coatings on flexible substrates, made of paper or of polymeric film, for example. In these applications, the liquid silicone coating formulations comprise, in addition to the silicone polymers, a polycondensation or polyaddition catalyst or a free-radical or cationic initiator.

Although the primary function of such silicone coating is the nonadhesiveness of its outer face, the coating must nevertheless be attached by its inner face to the flexible solid substrate with a good adhesion.

Release coatings are useful for numerous applications where it is necessary to make a surface or a material nonadhesive with respect to other materials to which they would normally adhere. For example, silicone compositions are used as coatings for release papers and may thus be combined with adhesive elements that can easily be detached without losing their adhesive properties: such elements may be pressure-sensitive adhesives for labels, decorative laminates, transfer tape, etc. Release coatings based on silicone, applied to paper, polyethylene, polypropylene, polyester, and other substrates of this type, are also useful as release surfaces for industrial packaging and food handling applications.

Although compositions which crosslink by polyaddition or cationically are widespread for the formation of coatings on flexible substrates, it remains the case that compositions which crosslink via polycondensation reactions retain a substantial advantage on account of their ease of use (crosslinking via atmospheric moisture or by addition of water at ambient temperature) and the fact that they do not require the supplying of energy (thermal or by UV radiation) for their use.

Formulations of elastomers which crosslink by polycondensation generally involve a silicone oil, generally a polydimethylsiloxane, which has terminal hydroxyl groups, optionally prefunctionalized with a silane so as to exhibit alkoxy end groups, a crosslinker, a polycondensation catalyst, conventionally a tin salt or an alkyl titanate, a reinforcing filler, and other, optional additives such as bulking fillers, adhesion promoters, dyes, biocides, etc.

These organopolysiloxane compositions which are vulcanizable at ambient temperature are well-known and are classed into 2 distinct groups: one-component (RTV-1) compositions and two-component (RTV-2) compositions.

The term "RTV" is the acronym for "Room Temperature Vulcanizing".

On crosslinking, the water (either provided by atmospheric humidity, in the case of RTV-1 compositions, or introduced into part of the composition, in the case of RTV-2 compositions) allows the polycondensation reaction, which leads to the formation of the elastomeric network.

Generally speaking, one-component compositions (RTV-1) crosslink when they are exposed to atmospheric humidity, and are therefore unable to crosslink in a confined medium. For example, one-component silicone compositions used as mastics or adhesives undergo cold crosslinking in accordance with a mechanism of hydrolysis of reactive functions of the acetoxysilane, ketiminoxysilane and/or alkoxysilane type, etc., followed by condensation reactions between silanol groups that are formed and other, residual reactive functions. The hydrolysis is generally carried out by virtue of the water vapor which diffuses into the material from the surface exposed to the atmosphere. Generally speaking, the kinetics of polycondensation reactions are extremely slow; these reactions are therefore catalyzed by an appropriate catalyst. As catalysts used, it is usual to employ catalysts based on tin, on titanium, or on an amine, or compositions of these catalysts. The catalysts based on tin (cf. in particular FR-A-2 557 582) and on titanium (cf. in particular FR-A-2 786 497) are highly effective catalysts. One-component silicone elastomers with —Si(OR) end groups are sometimes referred to as alkoxy elastomers.

The two-component compositions are sold and stored in the form of two components, a first component containing the polymeric base materials and the second component containing the catalyst. The two components are mixed at the time of use, and the mixture crosslinks in the form of a relatively hard elastomer. These two-component compositions are well-known and are described in particular in the work by Walter Noll, "Chemistry and Technology of Silicones", 1968, $2^{nd}$ edition, on pages 395 to 398. These compositions essentially comprise 4 different ingredients:

a reactive α,ω-dihydroxydiorganopolysiloxane polymer,
a crosslinking agent, generally a silicate or a polysilicate,
a tin catalyst, and
water.

The condensation catalyst is usually based on an organotin compound. Indeed, numerous tin-based catalysts have already been proposed as crosslinking catalysts for these RTV-1 or RTV-2 compositions. Conventional polycondensation catalysts comprise dialkyltin compounds, especially dialkyltin dicarboxylates such as dibutyltin dilaurate and diacetate, alkyl titanate compounds such as tetrabutyl or tetraisopropyl titanate, and titanium chelates (EP-A-0 885 933, U.S. Pat. No. 5,519,104, U.S. Pat. No. 4,515,932, U.S. Pat. No. 4,563,498, U.S. Pat. No. 4,528,353).

However, the alkyltin-based catalysts, although highly effective, and usually colorless, liquid and soluble in the silicone oils, have the drawback of being toxic (CMR2, toxic for reproduction).

Accordingly, international application WO 2004/020525 describes one-component (RTV-1) silicone compositions which are used as mastics or adhesives and which undergo cold crosslinking when exposed to atmospheric humidity, these compositions comprising, in addition to the customary components:

a specific, essential crosslinker (D), which is a silane having 1-methylvinyloxy functions, and is known for its high reactivity by comparison with that of conventional crosslinkers, and catalysts which are organic, imino-functional derivatives, of formula (I) or (II) below:

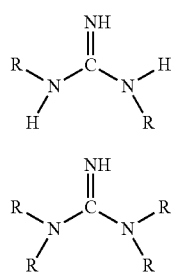

where R is a specific radical selected from the following groups: methyl, isopropyl, phenyl, and ortho-tolyl. Examples of these organic, imine-type derivatives are 1,3-diphenylguanidine, 1,3-di-o-tolylguanidine, 1,3-dimethylguanidine, and 1,1,3,3-tetramethylguanidine, which is the preferred derivative. These derivatives have the particular feature of possessing an unsubstituted imine function, in other words a function of the type C=NH.

It should be noted that a conventional trialkoxysilane crosslinker, component (E), is still used in combination with the crosslinker (D), which is a silane renowned for its high reactivity due to the presence of 1-methylvinyloxy functions.

However, the problem associated with the use of the imino-functional organic catalysts described in international application WO 2004/020525 is that they have to be used in the presence of specific crosslinkers which are very reactive and expensive (silanes having 1-methylvinyloxy functions), which is to say that conventional crosslinkers with simple structures, which are very widely used in RTV-I or RTV-II formulations, such as alkyltrialkoxysilanes, alkyl silicates or polyalkyl silicates, for example, cannot be combined with them without the mandatory presence of a highly reactive crosslinker such as the silane having 1-methylvinyloxy functions. The reason is that, without the presence of this very reactive silane, the crosslinking of the composition to form elastomer is inadequate, and does not allow good mechanical properties to be obtained. Accordingly, when the 1,1,3,3-tetramethylguanidine derivative, which is presented in the preferred embodiment of this patent application, is used with a conventional crosslinker, such as a polyalkyl silicate, for example, and without the presence of a reactive, methylvinyloxy-functional silane, in a one-component RTV (RTV-I), the crosslinking of the system is inadequate and is unable to give rise to a silicone elastomer.

These problems of reactivity of the crosslinker, for example, in one-component silicone compositions (RTV-1) are well-known to the skilled person. The reason is that the alkoxysilane crosslinkers most commonly used are those which have methoxy groups, on account of their intrinsic reactivities. However, one of the problems associated with the use of this type of alkoxysilanes is release of methanol, which is a source of problems from the standpoints of hygiene and of safety.

In this context, one of the key objectives of the present invention is to develop a method for coating a flexible substrate with a tin-free, polycondensation-crosslinkable elastomeric silicone composition.

A second key objective of the present invention is to develop a method for coating a flexible textile substrate, which, after crosslinking of a tin-free silicone composition, imparts an adhesion (or tack) effect to the coated textile, without increasing the pressure of the textile on the skin.

A third key objective of the present invention is to develop a method for coating a flexible substrate with a silicone composition which, after crosslinking, adheres suitably to the substrate while imparting release properties to the flexible substrate treated.

All of these objectives, among others, are achieved by the present invention, which relates to a method for coating a silicone composition X, which is a precursor of an elastomer and is crosslinkable by polycondensation reactions, onto a flexible substrate S which is made of textile, of paper, of polyvinyl chloride, of polyester, of polypropylene, of polyamide, of polyethylene, of polyurethane or of polyethylene terephthalate, comprising the following steps a), b), and c):

a) a silicone composition X is prepared which is crosslinkable to elastomer by polycondensation reactions, which contains no metal catalyst, and which comprises:

a silicone base B comprising at least one polyorganosiloxane oil which is crosslinkable by polycondensation reaction so as to form a silicone elastomer, and a catalytically effective amount of at least one polycondensation catalyst A which is a nonsilylated organic compound conforming to the general formula (I):

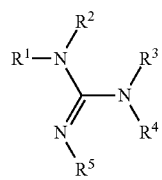

in which the identical or different radicals $R^1$, $R^2$, $R^3$, $R^4$ or $R^5$ represent independently of one another a linear or branched monovalent alkyl group, a cycloalkyl group, a (cycloalkyl)alkyl group, the cyclic moiety being substituted or unsubstituted and possibly comprising at least one heteroatom or a fluoroalkyl group, an aromatic group, an arylalkyl group, a fluoroalkyl group or an alkylamine or alkylguanidine group, the radicals $R^1$, $R^2$, $R^3$ or $R^4$ may be joined in pairs so as to form a 3-, 4-, 5-, 6- or 7-membered aliphatic cyclic moiety optionally substituted by one or more substituents, and with the further condition that the radicals $R^1$, $R^2$, $R^3$, $R^4$ and $R^5$ contain no silicon atom;

b) then said silicone composition X is applied continuously or discontinuously to said flexible substrate S, and c) said silicone composition X is crosslinked in the presence of moisture provided by the ambient air or by prior addition of water, so as to form a silicone elastomer.

Thus, the radicals $R^1$, $R^2$, $R^3$, $R^4$ or $R^5$ are not hydrogen atoms.

In order to achieve this objective, the Applicant had the merit to demonstrate, entirely surprisingly and unexpectedly, that the nonsilylated compounds conforming to the general formula (I) allow the production of flexible substrates coated with a tin-free silicone elastomer with good mechanical properties.

The inventors have the further merit of having overcome the technical prejudice, as taught, for example, by international application WO 2004/020525, suggesting that, hitherto, catalysts which are close in terms of structure, such as 1,3-diphenylguanidine, 1,3-di-o-tolylguanidine, 1,3-dimethylguanidine or 1,1,3,3-tetramethylguanidine, should be combined with specific, highly reactive and expensive crosslinkers (silanes having 1-methylvinyloxy functions) in order to crosslink RTV formulations.

The nonsilylated compounds according to the invention, conforming to the general formula (I), are pentasubstituted guanidines and have the advantage of being liquid, colorless, odorless, and soluble in the silicone matrices. The nonsilylated guanidines according to the invention are employed in the silicone systems to be crosslinked in very small amounts, and, depending on the amount, allow the working time to be adapted to the application, while ensuring excellent hardnesses of the resulting elastomers, and also an excellent thermal stability, thereby removing the problems associated with reversion phenomena.

The polycondensation catalyst A is a nonsilylated organic compound conforming to the general formula (I), in which:

the identical or different radicals $R_1$ and the radical $R_3$ are selected independently of one another from the group consisting of an isopropyl radical, a cyclohexyl radical, and a linear or branched monovalent $C_1$-$C_{12}$ alkyl radical, the radical $R_2$ represents a linear or branched monovalent alkyl group, a cycloalkyl group, an alkyl group substituted by a cyclic moiety which is substituted or unsubstituted and possibly comprises at least one heteroatom, an arylalkyl group, a fluoroalkyl group or an alkylamine or alkylguanidine group, and the radicals $R^1$, $R^2$, $R^3$ or $R^4$ may be joined in pairs so as to form a 3-, 4-, 5-, 6- or 7-membered aliphatic cyclic moiety which is optionally substituted by one or more substituents.

Particularly preferred polycondensation catalysts A are nonsilylated organic compounds selected from the group consisting of the following compounds (A1) to (A4):

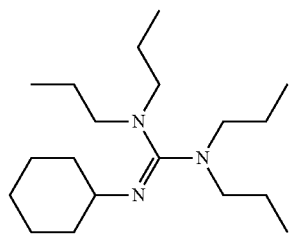
(A1)

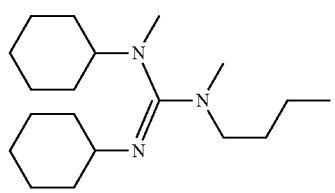
(A2)

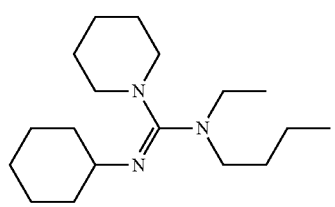
(A3)

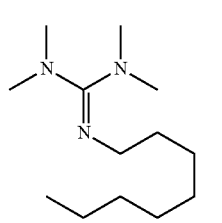
(A4)

The catalysts in accordance with the present invention are not reproductively toxic, unlike the alkyltin-based catalysts. Moreover, both for one-component or two-component compositions, they allow gaskets to be obtained that exhibit enhanced resistance to the fluids used in engines, relative to those obtained from conventional compositions containing titanium or alkyltin-based catalysts.

The amount of polycondensation catalysts A according to the invention is generally between 0.1% and 10% by weight, relative to the total weight of the composition, preferably between 0.1% and 5%, for either a one-component or a two-component preparation.

The flexible substrates coated with a silicone release film are selected from the group consisting of substrates made of textile, of paper, of polyvinyl chloride, of polyester, of polypropylene, of polyamide, of polyethylene, of polyurethane or of polyethylene terephthalate.

Textile for the purposes of the invention is understood as a generic term which encompasses all textile structures. The textiles may be composed of threads, fibers, filaments and/or other materials. In particular they comprise flexible fabrics, irrespective of whether they are woven, bonded, knitted, braided, felt, needled, sewn, or produced by another mode of fabrication.

These textiles may be apertured, i.e., may comprise free spaces not consisting of textile. For the coating of the silicone composition of the invention to be effective, it is preferred for the smallest dimension of these free spaces to be less than 5 mm, in particular less than 1 mm.

According to the invention, any type of flexible textile substrate S may be used. The following may be recited indicatively:

natural textiles, such as: textiles of plant origin, such as cotton, flax, hemp, jute, coir, cellulosic fibers of paper; and textiles of animal origin, such as wool, hair, leather, and silks;

artificial textiles, such as: cellulosic textiles, such as cellulose or its derivatives; and proteinaceous textiles of animal or plant origin; and synthetic textiles, such as polyester, polyamide, polymallic alcohols, polyvinyl chloride, polyacrylonitrile, polyolefins, acrylonitrile, (meth)acrylate-butadiene-styrene copolymers and polyurethane.

The synthetic textiles obtained by polymerization or polycondensation may in particular comprise various types of additives in their matrix, such as pigments, delustrants, matting agents, catalysts, heat and/or light stabilizers, antistatic agents, flame retardants, and antibacterial, antifungal and/or antiacarian agents.

Types of textile surfaces include in particular the surfaces obtained by rectilinear intercrossing of the threads or fabrics, the surfaces obtained by curvilinear interlacing of threads or knits, mixtilinear surfaces or tulles, nonwoven surfaces, and composite surfaces. The multitude of possible textile surfaces that can be used in the method of the invention includes felts, denims, jacquard wovens, needlefelts, sewn fabrics, crocheted fabrics, grenadines, laces and lacework, damasks, voile fabrics, alpaca fabrics, barathea fabrics, dimity fabrics, looped fabrics, brocades, calicoes, velvets, canvases, chiffons, flocked fabrics, sized fabrics, buntings, braided fabrics, failles, foulards, cheesecloths, geotextiles, jaspé fabrics, matelassés, tufted fabrics, organzas, pleated fabrics, ribbons, and toiles.

The flexible textile substrate S used in the method of the present invention may be composed of one or more identical or different textiles assembled in a variety of ways. The textile may be a single-layer or multilayer textile. The textile substrate may for example be composed of a multilayer structure which can be produced by different means of assembly, such as mechanical means, such as sewing, welding, or continuous or dotwise bonding.

Further to the coating method according to the present invention, the flexible textile substrate S may undergo one or more other, subsequent treatments, also called enhancement or finishing treatments. These other treatments may be carried out before, after and/or during said coating method of the invention. Other, subsequent treatments include in particular the following: dyeing, printing, laminating, coating, assembly with other textile surfaces or materials, washing, degreasing, preforming or fixing.

According to one preferred embodiment of the invention, the flexible textile substrate S is a piece of lace or an elastic strip.

The textiles thus obtained, as they are or made up into textile articles, may be used in numerous applications, such as, for example, in the clothing segment, particularly for lingerie, such as the lacework on brassiere or stocking tops, and for hygiene articles, such as support bands or dressings. These textile articles may be positioned at various places on the body or on a garment by virtue, for example, of the adhesion provided by the silicone elastomer.

In practice, the antiadhesive silicone is applied at a rate of between 0.1 and 1, preferably 0.3 and 0.5, g/m², corresponding to thicknesses of the order of a micrometer.

Description of the Silicone Base B:

In the remainder of the present application, a conventional description will be given of the linear polyorganosiloxanes, the branched structure polyorganosiloxanes, and the polyorganosiloxane resins by means of the following customary notations, which are used to designate different siloxy units of formula M, D, T, and Q below:

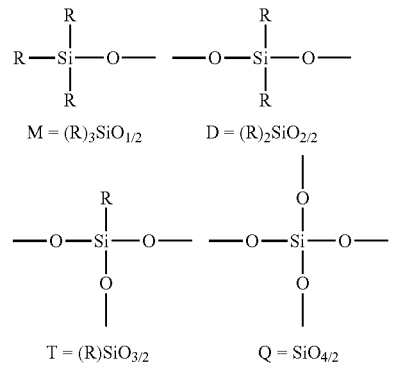

In these formulae, R may represent various saturated or unsaturated hydrocarbon groups, especially aromatic groups, which are optionally substituted by heteroatoms, and also nonhydrocarbon groups.

Conventionally, in this notation, the oxygen atoms are shared between two silicon atoms. Conventionally, a particular group R is indicated by citing it as a superscript after the symbol M, D or T. For example, $M^{OH}$ represents an M unit in which one group R is a hydroxyl group —OH.

The term "substantially linear" should be understood to mean a POS oil composed of D siloxy units and further comprising T siloxy units and/or Q siloxy units, the number of T and Q siloxy units being less than or equal to one per hundred silicon atoms.

The silicone bases used in the present invention, which crosslink and cure by polycondensation reactions, are well-known. The expression "polyorganosiloxane oil crosslinkable by polycondensation reaction" does not include the organic polymers having silicon-containing groups which are crosslinkable by polycondensation, such as those described, for example, in patent application EP-A1-1 985666 at page 4, lines 7 to 52.

The silicone bases according to the invention are described in detail more particularly in numerous patents and they are available commercially.

These silicone bases may be one-component bases, hence contained in a single pack, which are stable on storage in the absence of moisture and can be cured in the presence of moisture, more particularly moisture provided by the ambient air or by the water generated within the base on its use.

Further to one-component bases, it is possible to use two-component bases, hence bases contained in two packs, which cure when the two parts are mixed. They are packaged after incorporation of the catalyst in two separate fractions, it being possible for one of the fractions to contain, for example, only the catalyst according to the invention or a mixture with the crosslinking agent.

According to another preferred embodiment, the polyorganosiloxane composition X according to the invention as described above is characterized in that it further comprises a catalytically effective amount of at least one polycondensation catalyst A according to the invention, and as defined in the present application, and a silicone base B comprising:

at least one polyorganosiloxane oil C capable of crosslinking by polycondensation to give an elastomer;
optionally at least one crosslinking agent D;
optionally at least one adhesion promoter E; and optionally at least one nonsiliceous, organic and/or siliceous mineral filler F.

According to one particularly preferred embodiment, the polyorganosiloxane composition X which is crosslinkable to elastomer by polycondensation reactions comprises:

per 100 parts by weight of at least one polyorganosiloxane oil C capable of crosslinking by polycondensation, which is a reactive α,ω-dihydroxydiorganopolysiloxane polymer in which the organic radicals are hydrocarbon radicals preferably selected from the group consisting of: alkyls having from 1 to 20 carbon atoms; cycloalkyls having from 3 to carbon atoms; alkenyls having from 2 to 8 carbon atoms; and cycloalkenyls having from 5 to 8 carbon atoms;

from 0.1 to 60 parts by weight of at least one crosslinking agent D selected from the group consisting of: polyalkoxysilanes and the products originating from the partial hydrolysis of a polyalkoxysilane;

from 0 to 60 parts by weight of an adhesion promoter E as described below;

from 0 to 250 parts by weight, preferably from 5 to 200 parts by weight, of at least one nonsiliceous, organic and/or siliceous mineral filler F;

from 0 to 10 parts by weight of water, from 0 to 100 parts by weight of at least one nonreactive linear polyorganosiloxane polymer consisting of a linear homopolymer or copolymer in which, per molecule, the mutually identical or different monovalent organic substituents bonded to the silicon atoms are selected from alkyl, cycloalkyl, alkenyl, aryl, alkylarylene, and arylalkylene radicals, from 0 to 20 parts by weight of a coloring base or of a colorant H, from 0 to 70 parts by weight of polyorganosiloxane resins I, and from 0 to 20 parts of auxiliary additives J known to the skilled person, such as plasticizers, organic diluents, crosslinking retarders, mineral oils, antimicrobial agents, and heat stabilizer additives such as titanium oxides, iron oxides or cerium oxides, and from 0.1 to 50 parts by weight of at least one polycondensation catalyst A according to the invention and as defined in the present application.

According to another preferred embodiment, the polyorganosiloxane oil C has functionalized end groups of alkoxy type and is prepared in situ by reacting, in the presence of a catalytically effective amount of lithium hydroxide, a branched polydimethylsiloxane having hydroxyl groups bonded to a silicon atom, and of general formula $M_xD_yQ_z$ (where x, y, and z are integers), or a linear diorganopolysiloxane, comprising a hydroxyl group bonded to a silicon atom at each chain end, with at least one polyalkoxysilane of formula (II) below:

$$(R^4)_c(R^5)_a Si(OR^6)_{4-(a+c)} \quad (II)$$

in which:

a is 0, 1 or 2, c is 0, 1 or 2, the sum a+c is equal to 0, 1 or 2, $R^4$ represents an aliphatic, cyclanic or aromatic, substituted or unsubstituted, and saturated or unsaturated monovalent $C_1$ to $C_{13}$ hydrocarbon radical, it being possible for $R^4$ to be identical to $R^5$, $R^5$ represents an aliphatic, cyclanic or aromatic, substituted or unsubstituted, and saturated or unsaturated monovalent $C_1$ to $C_{13}$ hydrocarbon radical, which may comprise an epoxy, primary, secondary or tertiary amine, or mercapto function, and $R^6$ represents an aliphatic organic radical having from 1 to 8 carbon atoms which is selected in particular from alkyl radicals, alkyl ether radicals, alkyl ester radicals, alkyl ketone radicals, alkylcyano radicals, and aralkyl radicals having from 7 to 13 carbon atoms, it being understood that the alkoxy groups of the silane of formula (II) may each have a different meaning for $R^6$, or the same meaning.

According to another preferred embodiment, the polyorganosiloxane oil C is preferably an α,ω-dihydroxypolydiorganosiloxane polymer with a viscosity of between 50 and 5 000 000 mPa·s at 25° C., and the crosslinking agent D is preferably an organosilicon compound bearing more than two hydrolyzable groups bonded to the silicon atoms per molecule.

The polyorganosiloxane oil C may also be functionalized at its ends with hydrolyzable radicals, obtained by condensing a precursor bearing hydroxyl functions with a crosslinking silane which bears hydrolyzable radicals (or by hydrosilylation of terminal ≡SiVinyl or ≡SiH functions). Branched polyorganosiloxanes may also be contemplated, optionally comprising alkylsilyl groups within the chain, and/or at the chain end, these being polyorganosiloxanes having groups that are capable of reacting by polycondensation reactions within the chain and/or at the chain end, and "inter-chain" alkyl groups connecting two polyorganosiloxane chains to one another.

The crosslinking agents D are products which are available on the silicones market; moreover, their use in compositions which cure from ambient temperature is known; it features, in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799, and FR-A-2 067 636.

The crosslinking agent D has at least one hydrolyzable group such as:

acyloxy of formula —O—CO—R'
alkoxy of formula —O—R'
amino of formula —NR$^1$R$^2$
amido of formula —NR$^1$COR$^2$
alkenyloxy of formula —O—CR$^1$=CHR$^2$
aminoxy of formula —O—NR$^1$R$^2$
ketiminoxy of formula —O—N=CR$^1$R$^2$ or

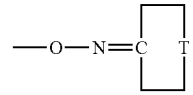

where R' represents an alkyl or aryl radical having from 1 to 15 carbon atoms, R$^1$ and R$^2$, which are identical or different, represent alkyl or aryl radicals containing from 1 to 8 carbon atoms, and T is an alkylene radical containing from 4 to 8 carbon atoms. The radicals R', R$^1$, and R$^2$ include, very particularly, the following radicals: methyl, ethyl, cyclohexyl, and phenyl. Among the radicals T, mention may be made very particularly of those of formula: —(CH$_2$)$_4$—, —(CH$_2$)$_5$—, and —(CH$_2$)$_6$—.

Examples of alkoxysilanes include those of formula:

Si(OCH$_3$)$_4$

Si(OCH$_2$CH$_3$)$_4$

Si(OCH$_2$CH$_2$CH$_3$)$_4$ (CH$_3$O)$_3$SiCH$_3$ (C$_2$H$_5$O)$_3$SiCH$_3$ (CH$_3$O)$_3$Si(CH=CH$_2$)

(C$_2$H$_5$O)$_3$Si(CH=CH$_2$)

(CH$_3$O)$_3$Si(CH$_2$—CH=CH$_2$)

(CH$_3$O)$_3$Si[CH$_2$—(CH$_3$)C=CH$_2$]

(C$_2$H$_5$O)$_3$Si(OCH$_3$)

Si(OCH$_2$—CH$_2$—OCH$_3$)$_4$

CH$_3$Si(OCH$_2$—CH$_2$—OCH$_3$)$_3$ (CH$_2$=CH)Si(OCH$_2$CH$_2$OCH$_3$)$_3$

C$_6$H$_5$Si(OCH$_3$)$_3$

C$_6$H$_5$Si(OCH$_2$—CH$_2$—OCH$_3$)$_3$.

The ketiminoxysilane crosslinkers have been known for a long time. They are, for example, described in French patents FR-A-1 314 649 and FR-A-1 371 250, in U.S. Pat. No. 3,678,003 and U.S. Pat. No. 3,986,999, in U.K. patent GB-A-1 468 467, in Belgium patent BE-A-901 479, and in European patent EP-A-157 580.

Examples of ketiminoxysilanes include those of formula:

CH$_3$Si[—O—N=C(CH$_3$)$_2$]$_3$,

CH$_3$Si[—O—N=C(CH$_3$)C$_2$H$_5$]$_3$,

CH$_2$=CHSi[—O—N=C(CH$_3$)C$_2$H$_5$]$_3$,

C$_6$H$_5$Si[—O—N=C(CH$_3$)$_2$]$_3$,

CH$_3$Si[—O—N=C(C$_2$H$_5$)(CH$_2$)$_3$CH$_3$]$_3$, (CH$_3$)$_2$C=N—O—]Si[—O—N=C(CH$_3$)C$_2$H$_5$]$_3$,

CH$_3$Si[—O—N=C(CH$_3$CH(C$_2$H$_5$)(CH$_2$)$_3$CH$_3$]$_3$,

CH$_3$Si[—O—N=C(CH$_3$CH(C$_2$H$_5$)(CH$_2$)$_3$CH$_3$]$_3$,

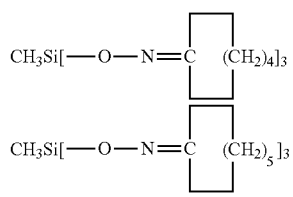

The acyloxysilane crosslinkers have been well-known for a long time. They are described in particular in U.S. Pat. No. 3,077,465, U.S. Pat. No. 3,382,205, U.S. Pat. No. 3,701,753, U.S. Pat. No. 3,957,714, U.S. Pat. No. 4,115,356, U.S. Pat. No. 4,273,698, FR-A-2 429 811, and FR-A-2 459 820.

Examples of acyloxysilanes include those of formula:

CH$_3$Si(OCOCH$_3$)$_3$,

C$_2$H$_5$Si(OCOCH$_3$)$_3$

CH$_2$=CHSi(OCOCH$_3$)$_3$

C$_6$H$_5$Si(OCOCH$_3$)$_3$,

CH$_3$Si[OCOCH(C$_2$H$_5$)—(CH$_2$)$_3$—CH$_3$]

CF$_3$CH$_2$CH$_2$Si(OCOC$_6$H$_5$)$_3$

CH$_3$Si(OCOCH$_3$)$_2$[OCOH(C$_2$H$_5$)—(CH$_2$)$_3$—CH$_3$]

CH$_3$COOSi[OCOCH(C$_2$H$_5$)—(CH$_2$)$_3$—CH$_3$]

Other examples of crosslinking agent D include the following:
the silanes and the products of partial hydrolysis of this silane, of following general formula:

R$^1_k$Si(OR$^2$)$_{(4-k)}$ in which:
the symbols R$^2$, which are identical or different, represent alkyl radicals having from 1 to 8 carbon atoms, such as methyl, ethyl, propyl, butyl, pentyl, and 2-ethylhexyl radicals and C$_3$-C$_6$ oxyalkylene radicals, and
the symbol R$^1$ represents a linear or branched, saturated or unsaturated aliphatic hydrocarbon group, or a saturated or unsaturated and/or aromatic, monocyclic or polycyclic carbocyclic group, and k is 0, 1 or 2; and Among the crosslinking agents D, preference is given more particularly to alkoxysilanes, ketiminoxysilanes, alkyl silicates, and polyalkyl silicates in which the organic radicals are alkyl radicals having from 1 to 4 carbon atoms.

Other examples of crosslinking agent D include polyethyl silicate or poly-n-propyl silicate.

Generally speaking, from 0.1 to 60 parts by weight of crosslinking agent D are used per 100 parts by weight of polyorganosiloxane C which is capable of crosslinking by polycondensation to give an elastomer.

Accordingly, the composition according to the invention may comprise at least one adhesion promoter E such as, for example, the organosilicon compounds bearing both:
(1) one or more hydrolyzable groups bonded to the silicon atom, and
(2) one or more organic groups substituted by radicals comprising one or more nitrogen atoms, heteroatoms S or O) of mercaptan, urea or isocyanurate groups) or selected from the group of (meth)acrylate, epoxy, and alkenyl radicals, and more preferably still from the group consisting of the following compounds, taken alone or as a mixture:
vinyltrimethoxysilane (VTMO),
3-glycidyloxypropyltrimethoxysilane (GLYMO),
methacryloyloxypropyltrimethoxysilane (MEMO),

[H$_2$N(CH$_2$)$_3$]Si(OCH$_2$CH$_2$CH$_3$)$_3$,

[H$_2$N(CH$_2$)$_3$]Si(OCH$_3$)$_3$

[H$_2$N(CH$_2$)$_3$]Si(OC$_2$H$_5$)$_3$

[H$_2$N(CH$_2$)$_4$]Si(OCH$_3$)$_3$

[H$_2$NCH$_2$CH(CH$_3$)CH$_2$CH$_2$]SiCH$_3$(OCH$_3$)$_2$

[H$_2$NCH$_2$]Si(OCH$_3$)$_3$

[n-C$_4$H$_9$—HN—CH$_2$]Si(OCH$_3$)$_3$

[H$_2$N(CH$_2$)$_2$NH(CH$_2$)$_3$]Si(OCH$_3$)$_3$

[H$_2$N(CH$_2$)$_2$NH(CH$_2$)$_3$]Si(OCH$_2$CH$_2$OCH$_3$)$_3$

[CH$_3$NH(CH$_2$)$_2$NH(CH$_2$)$_3$]Si(OCH$_3$)$_3$

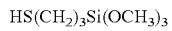

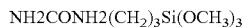

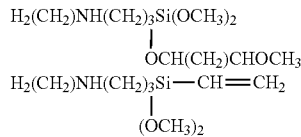

or polyorganosiloxane oligomers containing such organic groups in an amount of more than 20%.

These one-component bases may be admixed with adhesion promoters E selected, for example, from organosilicon compounds bearing both, on the one hand, organic groups substituted by radicals selected from the group of amino, ureido, isocyanate, epoxy, alkenyl, isocyanurate, hydentoil, guanidino, and mercaptoester radicals, and, on the other hand, hydrolyzable groups, generally alkoxy groups, bonded to the silicon atoms.

Examples of such adhesion agents are described in the U.S. Pat. No. 3,517,001, U.S. Pat. No. 4,115,356, U.S. Pat. No. 4,180,642, U.S. Pat. No. 4,273,698, and U.S. Pat. No. 4,356,116 and in the European patents EP 31 996 and EP 74 001.

For the one-component and two-component bases, use is made, as mineral fillers F, of very finely divided products for which the average particle diameter is less than 0.1 µm. These fillers include fumed silicas and precipitated silicas; their BET specific surface area is generally greater than 40 m$^2$/g. These fillers may also take the form of more coarsely divided products, having an average particle diameter of greater than 0.1 µm. Examples of such fillers include ground quartz, diatomaceous silicas, calcium carbonate, optionally surface-treated with an organic acid or with an ester of an organic acid, calcined clay, rutile titanium oxide, iron, zinc, chromium, zirconium, and magnesium oxides, the various forms of alumina (hydrated or unhydrated), boron nitride, lithopone, barium metaborate, barium sulfate, and glass microbeads; their specific surface area is generally less than 30 m$^2$/g.

These fillers may have been surface modified by treatment with the various organosilicon compounds commonly employed for this purpose. Accordingly, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885, and FR-A-1 236 505, U.K. patent GB-A-1 024 234). In most cases, the treated fillers contain from 3% to 30% of their weight of organosilicon compounds. The fillers may be composed of a mixture of two or more types of fillers with different particle size; thus, for example, they may be composed of 30% to 70% of finely divided silicas with a BET specific surface area of greater than 40 m$^2$/g, and of 70% to 30% of more coarsely divided silicas with a specific surface area of less than 30 m$^2$/g. These fillers may have been surface-treated.

The purpose of introducing fillers is to confer good mechanical and rheological characteristics on the elastomers that result from the curing of the compositions in accordance with the invention.

In combination with these fillers, it is possible to use organic and/or inorganic pigments and also agents that enhance the heat resistance (salts and oxides of rare earths, such as cerium oxides and hydroxides) and/or the flame resistance of the elastomers. Use may be made, for example, of the cocktails of oxides that are described in international application WO 98/29488. The agents which enhance the flame resistance include halogenated organic derivatives, organic phosphorus derivatives, platinum derivatives such as chloroplatinic acid (its products of reaction with alkanols and ether oxides), and platinous chloride-olefin complexes. These pigments and agents together represent not more than 20% of the weight of the fillers.

Other usual additives and auxiliary agents may be incorporated into the composition according to the invention; they are selected according to the applications in which said compositions are used.

The silicone base which is used for producing the composition according to the invention may comprise:
  100 parts of polyorganosiloxane oil C capable of crosslinking by polycondensation to give an elastomer;
  0 to 20 parts of a crosslinking agent D;
  0 to 20 parts of an adhesion promoter E; and
  0 to 50 parts of filler F.

Further to the principal constituents, nonreactive linear polyorganosiloxane polymers G may be introduced for the purpose of influencing the physical characteristics of the compositions in accordance with the invention and/or the mechanical properties of the elastomers resulting from the curing of these compositions.

These nonreactive linear polyorganosiloxane pblymers G are well-known; they comprise, more particularly: α,ω-bis(triorganosiloxy)diorganopolysiloxane polymers with viscosities of at least 10 mPa·s at 25° C., formed essentially from diorganosiloxy units and from not more than 1% of monoorganosiloxy and/or siloxy units, the organic radicals bonded to the silicon atoms being selected from methyl, vinyl, and phenyl radicals, at least 60% of these organic radicals being methyl radicals and not more than 10% being vinyl radicals. The viscosity of these polymers may reach a number of tens of millions of mPa·s at 25° C.; they therefore include oils with a fluid to viscous appearance, and soft to hard gums. They are prepared according to the usual techniques, which are described more specifically in French patents FR-A-978 058, FR-A-1 025 150, FR-A-1 108 764, and FR-A-1 370 884. Preference is given to using α,ω-bis(trimethylsiloxy)dimethylpolysiloxane oils with a viscosity of from 10 mPa·s to 1000 mPa·s at 25° C. These polymers, which act as plasticizers, may be introduced in a proportion of not more than 70 parts, preferably from 5 to 20 parts, per 100 parts of polyorganosiloxane oil C capable of crosslinking by polycondensation.

The compositions, according to the invention may further advantageously comprise at least one silicone resin H. These silicone resins are branched organopolysiloxane polymers which are well known and available commercially. They exhibit, per molecule, at least two different units selected from those of formula R'''$_3$SiO$_{1/2}$ (M unit), R'''$_2$SiO$_{2/2}$ (D unit), R'''SiO$_{3/2}$ (T unit), and SiO$_{4/2}$ (Q unit). The radicals R''' are identical or different and are selected from linear or branched alkyl radicals having from 1 to 10 carbon atoms, and vinyl, phenyl, and 3,3,3-trifluoropropyl radicals. The alkyl radicals preferably have from 1 to 6 carbon atoms inclusive. More particularly, mention may be made as alkyl radicals R of methyl, ethyl, isopropyl, tert-butyl, and n-hexyl radicals.

Examples of resins include the MQ resins, the MDQ resins, the DT resins, and the MDT resins.

In order to produce the compositions in accordance with the invention, it is necessary, in the case of the one-component compositions, to use equipment which allows the various fundamental constituents to be intimately mixed in a moisture-free environment, with and without supply of heat, these fundamental constituents being optionally admixed with the aforementioned adjuvants and additives. It is possible first of all to mix the organopolysiloxane oils C and the fillers F, and then to add to the resulting paste the crosslinkers D, the compounds E, and the catalyst according to the invention. It is also possible to mix the oils C, the crosslinkers D, the compounds E, and the fillers F, and to then add the catalyst according to the invention. During these operations, the mixtures can be heated at a temperature within the range 50-180° C. under atmospheric pressure or under a reduced pressure in order to promote the removal of volatile materials. According to one version, silicone oils with alkoxy units are prepared in situ by a functionalization reaction of an α,ω-dihydroxypolydimethylsiloxane oil by reaction with a silane or a polyalkoxysilane in the presence of a catalytically effective amount of lithium hydroxide (process described in patent application FR-2638752.

The one-component compositions in accordance with the invention, used as they are, i.e., undiluted, or in the form of dispersions in diluents, are stable on storage in the absence of water, and cure from low temperatures (following removal of the solvents in the case of the dispersions) in the presence of water to form elastomers.

Following the application of the compositions as they are to solid substrates, in a humid atmosphere, a process of curing to elastomer is observed, taking place from the outside to the inside of the material applied. A skin forms first at the surface, and then the crosslinking continues in depth. Complete formation of the skin, which results in a tack-free feel to the surface, requires a time period of several minutes, this period being dependent on the degree of relative humidity of the atmosphere surrounding the compositions and on the crosslinkability of said compositions.

The production of the two-component compositions in accordance with the invention takes place likewise by mixing of the various constituents in appropriate apparatus. To obtain homogeneous compositions, it is preferable first to mix the polymers A with the fillets C; the whole mixture can be heated for at least 30 minutes at a temperature of more than 80° C., so as to complete the wetting of the fillers by the oils. The resulting mixture, brought preferably to a temperature of less than 80° C., of the order of the ambient temperature, for example, may be admixed with the other constituents, namely the crosslinking agents, the catalyst, and, optionally, various additives and adjuvants, and even water.

According to another particularly preferred embodiment, the polyorganosiloxane composition X crosslinkable to elastomer by polycondensation reactions is prepared from a two-component system which takes the form of two separate parts P1 and P2, which are intended to be mixed to form said composition X, with one of these parts comprising the polycondensation catalyst A according to the invention, and as described in the present application, and the crosslinking agent D, whereas the other part is devoid of the aforementioned species and comprises:

per 100 parts by weight of the polyorganosiloxane oil or oils C capable of crosslinking by polycondensation to form an elastomer, and
from 0.001 to 10 part(s) by weight of water.

According to another, particularly preferred embodiment, the polyorganosiloxane composition X crosslinkable to elastomer by polycondensation reactions is prepared from a one-component system which is stable on storage in the absence of moisture and which crosslinks to an elastomer in the presence of water, comprises:

at least one crosslinkable linear polyorganosiloxane oil C having functionalized alkoxy, oxime, acyl and/or enoxy, preferably alkoxy, end groups,
at least one crosslinking agent D,
at least one filler F, and
at least one catalyst of the polycondensation reaction, which is the polycondensation catalyst A according to the invention and as described in the present application.

One-component bases are described in detail, for example, in patents EP 141 685, EP 147 323, EP 102 268, EP 21 859, FR 2 121 289, and FR 2 121 631, cited in reference.

Two-component bases are described in detail, for example, in patents EP 118 325, EP 117 772, EP 10 478, EP 50 358, EP 184 966, U.S. Pat. No. 3,801,572, and U.S. Pat. No. 3,888, 815, cited as reference.

According to one particularly advantageous embodiment of the invention, the polyorganosiloxane composition X which is crosslinkable to elastomer by polycondensation reactions comprises a sufficient amount of at least one thixotropic agent K, so as to have thixotropic properties.

In the sense of the invention, a thixotropic silicone composition is a composition which exhibits thixotropy, defined as being a rheological behavior on the part of a material subjected to shear that leads to a progressive destructuring of said material. Thixotropy, therefore, is a reversible phenomenon allowing a composition to be obtained which is in gel form at rest and which undergoes liquefaction when it is subjected to stirring or shearing. A thixotropic material, accordingly, undergoes a reduction in its viscosity when the shearing applied to it is increased, and returns to the initial viscosity conditions when shearing is no longer applied, after a certain time (see Rheology Handbook: "A practical Guide to Rheological Additives", Rheox, Inc., 1998).

Adding a thixotropic agent K allows the rheology of the polyorganosiloxane compositions X that are crosslinkable to elastomer to be controlled, and more particularly allows said compositions to be endowed with a nonrunning viscoelastic behavior.

Thixotropic agents are well-known in the art. They include the various organic and inorganic thickeners that are commonly used in silicone compositions.

The thixotropic agent K according to the invention is preferably selected from the group consisting of:

inorganic thickeners, boric acid and borates, titanates, aluminates, and zirconates;
compounds bearing hydroxyl groups;
compounds based on polyethylene and/or polypropylene;
compounds comprising cyclic amine functions;
compounds of polyether type or comprising polyether groups; and
fluoro resins, preferably based on polyfluoroethylene (PFE) and more preferably still based on polytetrafluoroethylene (PTFE or Teflon®).

Compounds bearing hydroxyl groups include, in particular, hydrophilic silicones bearing hydroxyl groups, such as polydimethylsiloxanes or polymethylphenylsiloxanes or polydiphenylsiloxanes or copolymers thereof with terminal dimethylhydroxy groups, or hydroxylated silicone resins of "MDT" type.

Compounds based on polyethylene and/or polypropylene include crystalline polyethylene or polypropylene waxes optionally bearing fluorine-containing groups (Crayvallac®).

In the sense of the invention, a "fluoro resin" is any fluoropolymer containing C—F bonds (see, for example, "Encyclopedia of Chemical Technology"—4$^{th}$ edition, 1994, Vol. 11, pp. 621-721) such as, for example:
- a polyvinyl fluoride,
- a polyvinylidene fluoride,
- a polytetrafluoroethylene (PTFE),
- a polymonochlorotrifluoroethylene,
- a polyfluoropolyether,
- a copolymer of ethylene and tetrafluoroethylene,
- a copolymer of tetrafluoroethylene and perfluorovinyl ether, and
- a copolymer of perfluoroethylene and perfluoropropylene.

All of the viscosities relevant in the present specification correspond to a dynamic viscosity value which is measured, in a manner known per se, at 25° C., with a Brookfield instrument, in accordance with standard AFNOR NFT 76 102 of February 1972. In the case of highly fluid products, the relevant viscosity in the present specification is the dynamic viscosity at 25° C., or Newtonian viscosity, in other words the dynamic viscosity which is measured, in a manner known per se, at a shear rate gradient which is sufficiently low for the viscosity measured to be independent of the rate gradient.

According to one preferred embodiment of the invention, in step b) said silicone composition X is applied to the flexible substrate S by transfer, by lick roller or by spraying using a nozzle, a doctor, a rotary machine or a reverse roll. The thickness of the layer of the silicone composition X applied to the textile is between 0.1 and 0.5 mm, preferably between 0.1 and 0.4 mm, and more preferably between 0.1 and 0.3 mm.

The invention further relates to the use of the silicone composition X as defined above for coating a flexible textile substrate S, and more particularly a piece of lace or an elastic strip.

The invention lastly relates to the use of the silicone composition X as defined above for coating a flexible substrate S made of paper, of polyvinyl chloride, of polyester, of polypropylene, of polyamide, of polyethylene, of polyurethane, of nonwoven fiberglass fabrics or of polyethylene terephthalate.

A specific language is used in the description so as to facilitate comprehension of the principle of the invention. It must nevertheless be understood that no limitation to the scope of the invention is intended by the use of this specific language. Modifications, improvements, and enhancements may in particular be envisaged by any person versed in the relevant technical field, on the basis of his or her own general knowledge. The term "and/or" includes the meanings and, or, and also all the other possible combinations of the elements connected to this term.

Other details or advantages to the invention will emerge more clearly from a reading of the examples given below solely by way of indication.

EXAMPLES

I) Preparation of the Catalysts According to the Invention (A-2): 1-Butyl-2,3-dicyclohexyl-1,3-dimethylguanidine A solution of 19.12 g of N-methyl-N-cyclohexylamine (0.169 mol) in 160 ml of hexane is admixed dropwise with 18.38 g of cyclohexyl isocyanate (0.147 mol) and then the cloudy mixture is heated at reflux for 2 hours, after which it is evaporated to dryness to give 35 g of crude N,N'-dicyclohexyl-N-methylurea. A suspension of 17 g of this crude product (71.33 mmol) in 65 ml of dry toluene is admixed with 12 g of POCl$_3$ (78 mmol) over 1 hour, and then, after a number of hours at 20° C., 15.5 g of N-butyl-N-methylamine (0.178 mmol) are added over 2 hours, and then, after a further 2 hours at 20° C., 50 ml of water are added. 49 g of 35% sodium hydroxide solution are then added with cooling, after which the two-phase mixture is extracted with diisopropyl ether. Following drying and evaporation to dryness, the oil obtained, 26.5 g, is distilled at 180° C. under 1 mbar to give 21.25 g of the expected guanidine (97% yield).

(A-3): N-butyl-N'-cyclohexyl-N-ethylpiperidine-1-carboxamidine

A solution of 18.62 g of piperidine (0.219 mol) in 360 ml of hexane is admixed dropwise with 23.8 g of cyclohexyl isocyanate (0.190 mol) and then the cloudy mixture is heated at reflux for 2 hours, after which it is cooled and filtered to give 39.3 g of pure N-cyclohexylpiperidine-1-carboxamide (98.3% yield). A suspension of 15.05 g of this pure product (71.6 mmol) in 65 ml of dry toluene is admixed with 12 g of POCl$_3$ (78 mmol) over 1 hour, and then, after a number of hours at 20° C., 18.1 g of N-butyl-N-ethylamine (0.179 mmol) are added over 2 hours, and then, after a further 2 hours at 20° C., 50 ml of water are added. 49 g of 35% sodium hydroxide solution are then added with cooling, after which the two-phase mixture is extracted with diisopropyl ether. Following drying and evaporation to dryness, the oil obtained, 20 g, is distilled at 185° C. under 1 mbar to give 17 g of the expected guanidine (81% yield).

II. Preparation of One-Component Compositions

Paste Test—Vinyltrimethoxysilane Crosslinker

The paste used is prepared as follows: a mixture of 3464 g of an α,ω-dihydroxy oil with a viscosity of 20 000 centipoises, containing 0.066% of OH, and 120 g of vinyltrimethoxysilane is admixed, with stirring, with 16 g of a 2% by weight solution of lithium hydroxide in methanol, and then, after 5 minutes, 400 g of AE55 fumed silica are added. The mixture is devolatilized under vacuum and then stored in a moisture-free environment.

For each test, the catalyst under test is mixed with 50 g of this paste, and then the catalytic potential is evaluated in 3 ways:
- the skinover time (SOT), the time after which surface crosslinking is observed, on a 2 mm film;
- the persistence of a tacky feel at 48 hours;
- the hardness (Shore A hardness) of a bead 6 mm thick under controlled conditions (23° C. and 50% relative humidity) and over increasing times (2, 3, 4, 7, and 14 days), and also after 7 days (7 d) at ambient temperature (AT) followed by 7 days at 100° C. In the results tables, the symbol ">" corresponds to the hardness values measured on the upper part of the bead, and the symbol "<" corresponds to the hardness values measured on the lower part of the bead, which is less exposed to the ambient air than the upper part.

Catalysts tested (A1) to (A4):

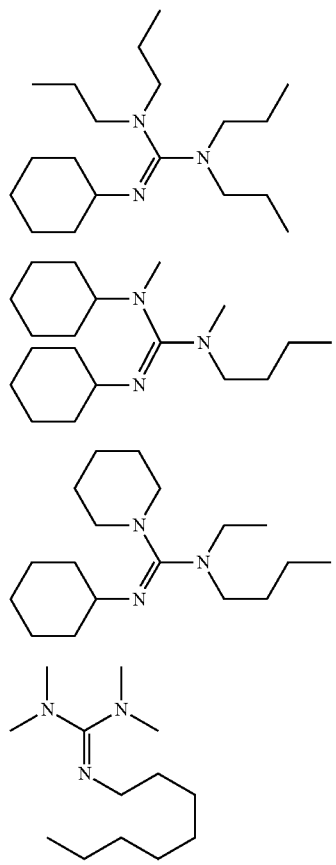

For comparison, the following were also tested:
a tin-based catalyst: dibutyltin dilaurate (DBTDL), and
1,1,3,3-tetramethylguanidine (TMG).

which are nontoxic, result in more effective catalysis than the catalysts based on tetramethylguanidine (TMG). The catalysts according to the invention may therefore advantageously replace the existing catalysts.

III) Coating onto Lace

Acetoxy RTV-1—Acetoxy-Type Silane Crosslinker

Formulation Tested (% by Weight):
The following paste is prepared:
70.8% of α,ω-dihydroxy polydimethylsiloxane oil with viscosity of 50 000 mPa·s
6.4% of α,ω-dihydroxy polydimethylsiloxane oil with viscosity of 14 000 mPa·s
α,ω-dihydroxy
9.6% of polydimethylsiloxane oil with viscosity of 500 mPa·s
10.4 of dimethylsilazane-treated silica This paste is then admixed with x % of the catalyst under test and 3.8% of a mixture of ethyltriacetoxy silane and methyltriacetoxy silane.

a) Amount of Catalyst Added (% by Weight):
DBTDL 0.06%
Catalyst according to the invention (A1) to (A4)=0.10 to 0.14% (5 equivalents/number of moles of tin).

The compositions are coated continuously with a thickness of 0.3 mm onto a standard knitted lace based on polyamide, polyester, and elastane. The coated lace is then crosslinked at ambient temperature until the elastomer is obtained. The properties of the elastomer that are obtained are satisfactory for the lace application.

The invention claimed is:
1. A method for coating a silicone composition X, which is a precursor of an elastomer and is crosslinkable by polycondensation reactions, onto a flexible substrate S which is made of textile, of paper, of polyvinyl chloride, of polyester, of polypropylene, of polyamide, of polyethylene, of polyurethane, of nonwoven fiberglass fabrics or of polyethylene terephthalate, comprising the following steps a), b), and c):

TABLE I

| Catalysts tested | No. eq 1 eq = 0.70 mM | % by weight | SOT stick min | Tacky feel at 48 h | 2 d > | 2 d < | 3 d > | 3 d < | 4 d > | 4 d < | 7 d > | 7 d < | 14 d > | 14 d < | 7 d AT + 7 d 100° C. > | 7 d AT + 7 d 100° C. < |
|---|---|---|---|---|---|---|---|---|---|---|---|---|---|---|---|---|
| (A-1) | 1.5 | 0.65 | 19 | yes | 7 | 0 | 12 | 7 | 18 | 13 | 26 | 22 | 31 | 27 | 28 | 27 |
| Inventive | 3 | 1.3 | 12 | no | 15 | 4 | 23 | 15 | 27 | 21 | 29 | 24 | 31 | 26 | 30 | 28 |
| (A-2) | 1.5 | 0.65 | 14 | yes | 10 | 1 | 13 | 6 | | | 29 | 22 | 31 | 26 | 31 | 28 |
| Inventive | 3 | 1.3 | 8 | no | 21 | 11 | 26 | 18 | | | 31 | 24 | 28 | 26 | 29 | 27 |
| (A-3) | 1.5 | 0.62 | 27 | yes | 8 | 5 | 13 | 5 | 18 | 12 | 27 | 21 | 32 | 26 | 30 | 25 |
| Inventive | 3 | 1.2 | 18 | no | 15 | 3 | 23 | 15 | 26 | 21 | 30 | 26 | 32 | 27 | 32 | 27 |
| DBTDL | 1.00 | 0.93 | 17 | no | 32 | 21 | 33 | 30 | 35 | 31 | 35 | 31 | 31 | 30 | 29 | 25 |
| TMG | 4 | 0.64 | 2 | yes | 2 | 1 | 2 | 1 | / | | 4 | 3 | 2 | 1 | 1 | 1 |

1,1,3,3-Tetramethylguanidine (TMG) does not allow crosslinking of the silicone oil, even at molar concentrations much higher than the guanidines according to the invention (A1) to (A3). The guanidines (A1) to (A3) make it possible not only, by adapting the amounts to very low values, to modulate the durations of the skinover times, but also to obtain elastomers which have high thermal stability and mechanical properties that are very close to those obtained with the tin catalyst (DBTDL). Moreover, these results show that the catalysts according to the invention (A1) to (A3), a) preparing a silicone composition X that is crosslinkable to elastomer by polycondensation reactions, which contains no metal catalyst, and which comprises:
a silicone base B comprising at least one polyorganosiloxane oil that is crosslinkable by polycondensation reaction so as to form a silicone elastomer, and
a catalytically effective amount of at least one polycondensation catalyst which is a nonsilylated organic compound conforming to the general formula (I):

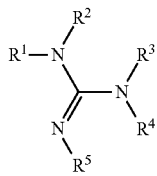

(I)

in which
- the identical or different radicals $R^1$, $R^2$, $R^3$, $R^4$ or $R^5$ represent independently of one another a linear or branched monovalent alkyl group, a cycloalkyl group, a (cycloalkyl)alkyl group, the cyclic moiety being substituted or unsubstituted and optionally comprising at least one heteroatom or a fluoroalkyl group, an aromatic group, an arylalkyl group, a fluoroalkyl group or an alkylamine or alkylguanidine group,
- the radicals $R^1$, $R^2$, $R^3$ or $R^4$ can be joined in pairs so as to form a 3-, 4-, 5-, 6- or 7-membered aliphatic cyclic moiety optionally substituted by one or more substituents, and
- with the further condition that the radicals $R^1$, $R^2$, $R^3$, $R^4$ and $R^5$ contain no silicon atom;

b) then applying said silicone composition X continuously or discontinuously to said flexible substrate S, and c) crosslinking said silicone composition X in the presence of moisture provided by the ambient air or by prior addition of water, so as to form a silicone elastomer.

2. The method as claimed in claim 1, wherein the polycondensation catalyst A is a nonsilylated organic compound selected from the group consisting of the following compounds (A1) to (A4):

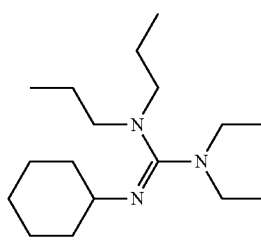

(A1)

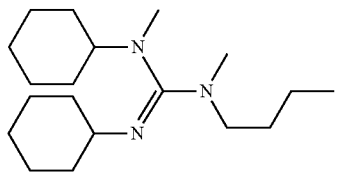

(A2)

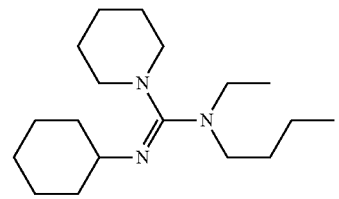

(A3)

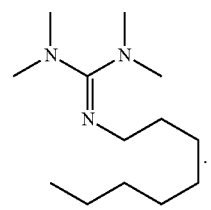

(A4)

3. The method as claimed in claim 1, wherein the organopolysiloxane composition X which is crosslinkable to elastomer by polycondensation reactions comprises a catalytically effective amount of at least one polycondensation catalyst A as defined in claim 1 and a silicone base B comprising:
- at least one polyorganosiloxane oil C which is crosslinkable by polycondensation to give an elastomer;
- optionally at least one crosslinking agent D;
- optionally at least one adhesion promoter E; and
- optionally at least one nonsiliceous, organic and/or siliceous inorganic filler F.

4. The method as claimed in claim 1, wherein in step b) said silicone composition X is applied to the flexible substrate S by transfer, by lick roller or by spraying using a nozzle, a doctor, a rotary machine or a reverse roll.

5. The method as claimed in claim 1, wherein the flexible textile substrate S is a piece of lace or an elastic strip.

6. A method of coating a flexible substrate S, the method comprising coating the flexible substrate S with the silicone composition X as defined in claim 1 wherein the flexible substrate S is a flexible textile substrate.

7. The method as claimed in claim 6, wherein the textile substrate is a piece of lace or an elastic strip.

8. A method of coating a flexible substrate S, the method comprising coating the flexible substrate S with the silicone composition X as defined in claim 1 wherein the flexible substrate S is made of paper, of polyvinyl chloride, of polyester, of polypropylene, of polyamide, of polyethylene, of polyurethane, of nonwoven fiberglass fabrics or of polyethylene terephthalate.

* * * * *